United States Patent [19]

Black

[11] 4,372,648
[45] Feb. 8, 1983

[54] OPTICAL FIBRES

[75] Inventor: Philip W. Black, Bishop's Stortford, England

[73] Assignee: International Standard Electric Corporation, New York, N.Y.

[21] Appl. No.: 201,944

[22] Filed: Oct. 29, 1980

[30] Foreign Application Priority Data

Oct. 29, 1979 [GB] United Kingdom ............... 7937477

[51] Int. Cl.³ ............................................. G02B 5/172
[52] U.S. Cl. .................... 350/96.33; 65/3.12; 65/3.13
[58] Field of Search .................. 350/96.33; 65/3.11, 65/3.12, 3.13, 3.2

[56] References Cited

U.S. PATENT DOCUMENTS 4,327,965  5/1982  Black ............................... 350/96.33
4,334,733  6/1982  Takeshima et al. ............... 350/96.33

FOREIGN PATENT DOCUMENTS 1047810  2/1979  Canada .............................. 350/96.33

*Primary Examiner*—Paul L. Gensler
*Attorney, Agent, or Firm*—John T. O'Halloran

[57] ABSTRACT

A secure optical fibre consists of an inner waveguiding structure surrounded by an outer waveguiding structure and separated therefrom by an optical absorbing layer (3) rendered absorbing by irradiation. The inner waveguiding structure comprises a core (1) surrounded by a lower refractive index cladding layer (2). The outer waveguiding structure comprises an annular core layer (5) sandwiched between lower refractive index inner and outer cladding layers (4 and 6).

15 Claims, 1 Drawing Figure

$n_1 > n_2$
$n_5 > n_6$
$n_5 > n_4$
$(n_2 \neq n_3)$

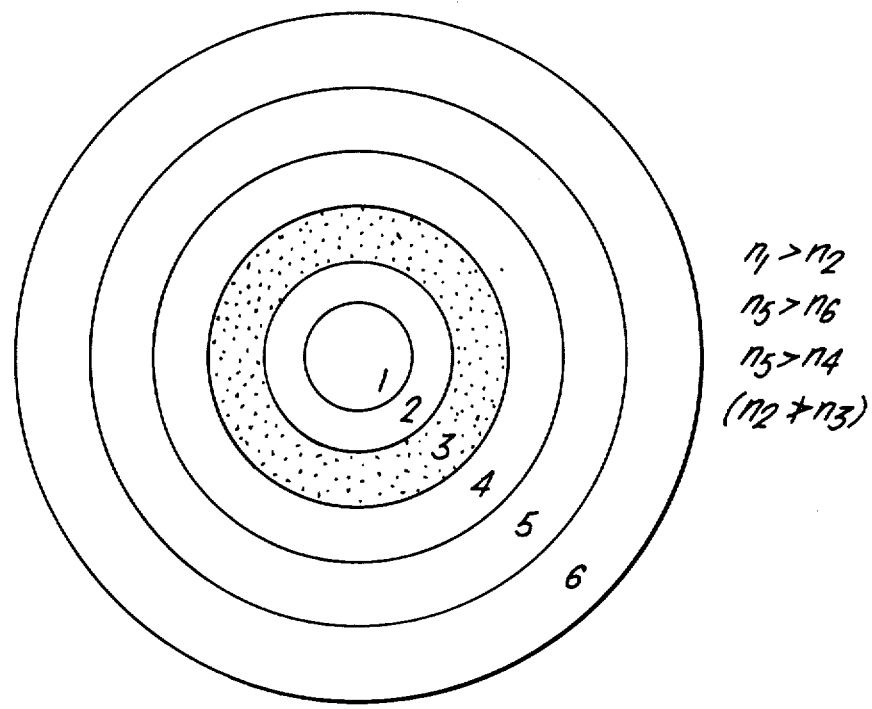

OPTICAL FIBRES

This invention relates to optical fibres, and particularly to optical fibres designed to make clandestine tapping particularly difficult to achieve.

There are occasions when information of a secure nature needs to be transmitted between locations which are sufficiently separated to make the guarantee of the physical integrity of the transmission medium very difficult. One basic solution to this problem is to scramble the signal at the source and to decode it at the receiver. A second basic solution is to provide some form of physical guard around the transmission medium so that access to it can not be achieved without breaking the guard. These two basic types of solution may be used independently or together. The present invention is particularly concerned with the second type of solution involving a physical guard.

In U.S. Pat. No. 4,000,416 there is disclosed an optical fibre construction in which a secure signal transmission link at the centre of an optical fibre is guarded by an encircling waveguide structure forming a monitoring transmission link which carries a monitoring signal. A reduction in the received strength of the monitoring signal provides an indication that the fibre may be being tampered with in order to gain access to its secure signal transmission link.

The present invention uses a somewhat similar structure but includes an absorption layer between the secure signal and monitoring links.

According to the present invention there is provided an optical fibre having an inner waveguiding structure of irradiation resistant material consisting of a transparent optical core surrounded by a lower refractive index optical cladding, which inner waveguiding structure is separated, by an intermediate layer of irradiation sensitive material rendered optically absorbing by irradiation, from an outer waveguiding structure also of irradiation resistant material consisting of an annular transparent optical core sandwiched between lower refractive index transparent inner and outer cladding layers of lower refractive index.

By irradiation resistant material is meant a material whose optical transmissivity is either relatively unaffected by irradiation, or whose transmissivity recovers after irradiation to near its original value within a period of a few hours. By irradiation sensitive material is meant material whose optical transmissivity is greatly increased by irradiation and remains greatly increased for an indefinite period of time.

There follows a brief description of general methods by which such optical fibre may be made and a description of a particular method by which a preferred embodiment of the invention is made. The description refers to the accompanying drawing depicting a schematic cross-section through the fibre.

The basic structure of the fibre is set out pictorially in the FIGURE. The optical part of the fibre consists of a core 1 surrounded by five concentric layers 2 to 6. Additional layers, not providing any optical function, may be included as physical support for the optical part, and the fibre itself will generally be packaged in a plastic sheath to provide further mechanical protection. These non-optical parts are not shown in the FIGURE. The core 1 and layer 2 co-operate to form the inner waveguiding structure, and for this purpose layer 1 must have a refractive index $n_1$ greater than the index $n_2$ of layer 2. Similarly, layers 4, 5, and 6 co-operate to form the outer waveguiding structure, with layer 5 forming an annular optical core. For this purpose layer 5 must have a refractive index $n_5$ that is greater than the indices $n_4$ and $n_6$ of the other two layers. Generally it will be desirable to choose for the layer 3 a material the real part of whose refractive index $n_3$ is not less than $n_2$. This will preclude the guiding of cladding modes by the interface between layers 2 and 3. This is not however in all circumstances essential.

One way of making such fibre involves the use of a nested set of concentric crucibles containing separate melts of the glass compositions that are to form the individual constituent layers of the fibre. The composite fibre is drawn from a set of concentric nozzles at the base of the crucibles.

Alternatively, a preferred way of making such fibre is by a method involving vapour deposition. Examples of suitable irradiation resistant materials for vapour deposition are pure undoped silica for optical core material, and silica doped with fluorine for the lower refractive index material required for optical cladding material. A suitable irradiation sensitive material is silica doped with titania. This has a higher index than pure undoped silica.

A vapour deposition method of manufacture may involve the deposition of a succession of layers on the curved surface of a cylindrical mandrel, axial growth of material by simultaneous deposition of the layers upon the end face of a mandrel, or sequential deposition of the layers upon the bore of a substrate tube.

In the case of deposition on the curved surface of a mandrel, the first layer to be deposited is a layer of glass to form the material of the core 1. When all the layers have been deposited, the mandrel is removed to leave a tubular structure. The bore of the resulting structure is collapsed, and fibre drawn from it. The layers forming the structure may be deposited as coherent void-free glassy layers in the first instance, or they may be formed as particulate deposits which are then individually, or as a group, sintered and consolidated into a coherent void-free glass.

In the case of deposition upon the bore of a substrate tube, the layers are deposited in inverse order, starting with the outermost layer, and finishing up with the deposition of a layer of glass to form the material of the core 1. When this final layer has been deposited, and if necessary consolidated, the coated tube is collapsed. Then optical fibre can be drawn at a later stage from the resulting solid cross-section optical fibre preform.

In a modification of the two sequential deposition methods outlined above, the deposition of the glass to form the material of the core 1 is dispensed with. In this case the bore of the resulting tubular structure of the internal or the external deposition process is not fully collapsed. Hollow fibre is then drawn from the structure. This is filled with a suitable liquid to form a fibre with a liquid inner core. Alternatively the coated tubular structure is collapsed on to a rod using conventional rod-in-tube fibre manufacturing technology to produce solid cored fibre.

In the case of the internal sequential deposition process a further modification is possible in some circumstances which simplifies the structure, reducing the number of layers to be deposited from six to four. This is possible for fibre applications for which the material of the substrate tube has an adequate optical transmissivity to be suitable as core material for the annular outer core. Under these circumstances the deposition commences with material to form layer 4, the inner cladding layer of the outer waveguiding structure. The outer cladding layer 6 of the outer waveguiding structure is provided, at a later stage, in the form of a low refractive index plastic layer applied on-line with the drawing of the fibre from its preform precursor. In this case the plastic layer serves the dual function of providing optical cladding and protecting the glass surface of the freshly drawn fibre from degradation by atmospheric attack. It will be appreciated that this use of a plastic layer 6 to perform the dual function of outer cladding and physical protection is also applicable to fibres made by other routes, such as the external sequential vapour deposition and simultaneous vapour deposition processes referred to above.

In a preferred method of manufacture the annular core 5 of the outer waveguiding structure is provided by the material of a silica substrate tube typically about 1 meter long and 14 by 12 mm in diameter. This tube is carefully cleaned, dried, and mounted in a special lathe having synchronously driven head-, and tail-stocks. Oxygen is passed down the tube which is rotated while an oxy-hydrogen flame is slowly traversed down its length. This ensures that the tube has a clean dry flame-polished bore ready to receive a layer of glass which will form the inner cladding layer 4 of the outer waveguiding structure.

All the material to be deposited upon the bore of the substrate tube is deposited by vapour reactions from which hydrogen and its compounds are excluded. This avoids the formation of water as a reaction product. The presence of any more than the smallest trace of water vapour is undesirable because it is very liable to lead to an excessive contamination of the deposit by hydroxyl groups which contribute an unwanted optical absorption. The preferred hydrogenfree deposition reaction involves the direct oxidation of halides with oxygen. Such reactions do not proceed spontaneously at room temperature but may be promoted in the localised region of the hot zone produced by the oxy-hydrogen flame. In order to produce a uniform thickness of deposit this flame is slowly traversed at a controlled rate along the length of the tube. It is preferred to adjust the rate of traversal and the temperature of the flame in order to produce a clear coherent glassy deposit in the first instance rather than a powdery one which requires subsequent sintering to consolidate it. The temperature required to produce a clear deposit depends upon whether the material being deposited is doped or not, and upon the particular dopant or dopant mixture employed and its concentration. A number of traversals of the flame is required in order to build up a single layer of adequate thickness.

The material of layer 4 is deposited by reacting silicon tetrachloride and dichlorodifluoromethane with oxygen gas in order to form a low index deposit of silica doped with fluorine. The tetrachloride is transported using oxygen as a carrier gas bubbled through a flask of liquid silicon tetrachloride. To this gas stream is added a controlled flow of dichlorodifluoromethane, and further oxygen is added as a diluent. Typically the flow of gas through the flask containing silicon tetrachloride is a few hundred milli-liters per minute, the flow of dichlorodifluoromethane a few tens of milliliters per minute, and the flow of further oxygen about two liters per minute.

When the requisite quantity of material for layer 4 has been deposited the gas composition is changed by shutting off the flow of dichlorodifluoromethane and introducing a flow of oxygen through titanium tetrachloride. The flow rates are adjusted to provide a deposit for the material of layer 3 consisting of silica doped typically with between 5 and 10 mole % titania.

On completion of the deposition of material for this layer 3, which is to form the optically absorbing layer separating the inner and outer waveguiding structures, the gas composition is changed back to its original mixture for the deposition of material for layer 2. It is convenient, but not necessary, for layer 2, the cladding layer of the inner waveguiding structure, to have the same composition as that of layer 4, the inner cladding layer of the outer waveguiding structure.

The gas composition is then changed a final time for the deposition of the material to form the core 1 of the inner waveguiding structure. This is composed of undoped silica, and hence for the deposition of this layer the flow of dichlorodifluoromethane is discontinued.

Next the bore of the coated tube is collapsed to form a solid cross-section optical fibre preform. This is brought about using a higher temperature flame to soften the wall of the tube so that it collapses under the effects of surface tension. Several traverses of the flame are employed to bring about complete collapse of the bore, and in order to ensure circular symmetry is maintained during the collapse process the interior of the tube is maintained at a small positive pressure with respect to the ambient.

The resulting preform is suitable for storage until such time as fibre is required. It is then mounted vertically in a pulling tower and lowered through a furnace at a controlled rate while fibre is drawn from its heat softening lower end. The fibre passes immediately through a coating station at which, before it has touched anything else, it is provided with a plastic coating which forms layer 6, the outer cladding of the outer waveguiding structure. A suitable plastic material having a refractive index less than that of the material of the substrate tube is the silicone resin marketed by Dow Corning under the designation SYLGARD 182. In addition to providing an optical cladding, the layer 6 also functions a layer protecting the freshly drawn surface of the glass part of the fibre from mechanical strength degradation by atmospheric attack.

Normally the fibre will be provided with at least one further plastic coating, for instance by extrusion, to form a protective sheath and ease mechanical handling problems.

The fibre is then ready for irradiation to render layer 3 strongly optically absorbing and effectively opaque. This may be achieved by irradiation of a reel of the fibre for a period of time to a level of $10^5$ rads using a gamma ray source, such as a source of cobalt 60.

In fibre made by a vapour reaction process from which hydrogen and its compounds are excluded it is generally found that the resulting deposit still contains a residual amount of hydroxyl group contamination at a concentration typically of less than 1 ppm. Normally silica grown in this way has shown an excellent recovery from the effects of irradiation, but a number of particularly 'dry' samples have exhibited a lengthened recovery time which gives rise to the possibility that if refinements of the processing technology still further reduce the background level of hydroxyl contamination it may be necessary deliberately to augment this reduced background by a very carefully controlled amount.

I claim:

1. An optical fibre having an inner waveguiding structure of irradiation resistant material consisting of a transparent optical core surrounded by a lower refractive index optical cladding, which inner waveguiding structure is separated, by an intermediate layer of irradiation sensitive material rendered optically absorbing by irradiation, from an outer waveguiding structure also of irradiation resistant material consisting of an annular transparent optical core sandwiched between lower refractive index transparent inner and outer cladding layers of lower refractive index.

2. An optical fibre as claimed in claim 1 wherein the core of the inner waveguiding structure is liquid.

3. An optical fibre as claimed in claim 1 or 2 wherein the cladding of the inner waveguiding structure, the intermediate layer, and the core and inner and outer cladding layers of the outer waveguiding structure are all made of glass.

4. An optical fibre as claimed in claim 1 or 2 wherein the cladding of the inner waveguiding structure, the intermediate layer, and the core and inner cladding layers of the outer waveguiding structure are all made of glass while the outer cladding layer of the outer waveguiding structure is made of plastic.

5. An optical fibre as claimed in claim 3 wherein the core of the outer waveguiding structure is made of undoped silica, and the cladding of the inner waveguiding structure and the inner cladding of the outer waveguiding structure are made of fluorine doped silica.

6. An optical fibre as claimed in claim 5 wherein the intermediate layer is made of titania doped silica.

7. An optical fibre as claimed in claim 5 or 6 wherein the core of the inner waveguiding structure is made of undoped silica.

8. An optical fibre as claimed in claim 5, 6, or 7 wherein the outer cladding layer of the outer waveguiding structure is made of silica.

9. A method of making an optical fibre as claimed in claim 3, wherein the core of the inner waveguiding structure is made of glass, and wherein the fibre, or at least that part of the fibre that is made of glass is drawn from the melt using a nested concentric array of crucibles.

10. A method of making an optical fibre as claimed in any claim of claims 1 where in one or more of the component parts of the fibre are made by a vapour deposition process in which said component parts are simultaneously built up by growth on the end of a mandrel in an axial direction.

11. A method of making an optical fibre as claimed in any claim of claims 1 wherein one or more of the component parts of the fibre are made by a vapour deposition process in which said component parts are grown sequentially upon the curved surface of a cylindrical mandrel.

12. A method of making an optical fibre as claimed in any claim of claims 1 wherein one or more of the component parts of the fibre are made by a vapour deposition process in which said component parts are grown sequentially upon the bore of a substrate tube.

13. A method as claimed in claim 12 wherein the deposition is confined to a localized hot zone produced by an oxy-hydrogen flame traversed along the length of the tube in order to produce a deposit of uniform thickness.

14. A method as claimed in claim 11, 12 or 13 wherein the material of the core of the primary waveguiding structure is introduced into the structure by a rod-in-tube process.

15. A method as claimed in any claim of claims 10 to 13 wherein the vapour deposition process is one from which hydrogen and its compounds are excluded.

* * * * *